Nov. 16, 1965     J. S. WRIGHT     3,217,427
GRAIN COOLING APPARATUS
Original Filed April 15, 1960
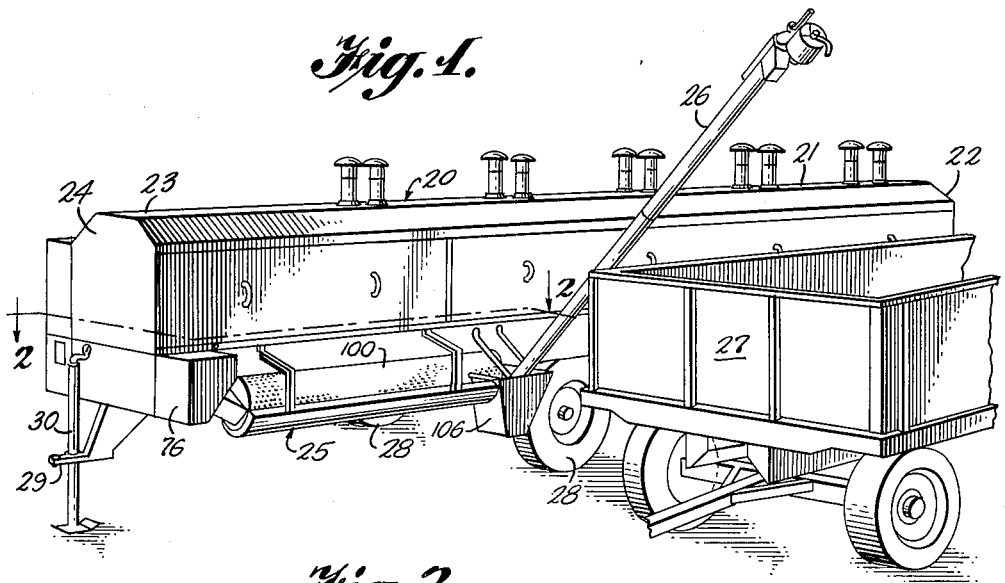
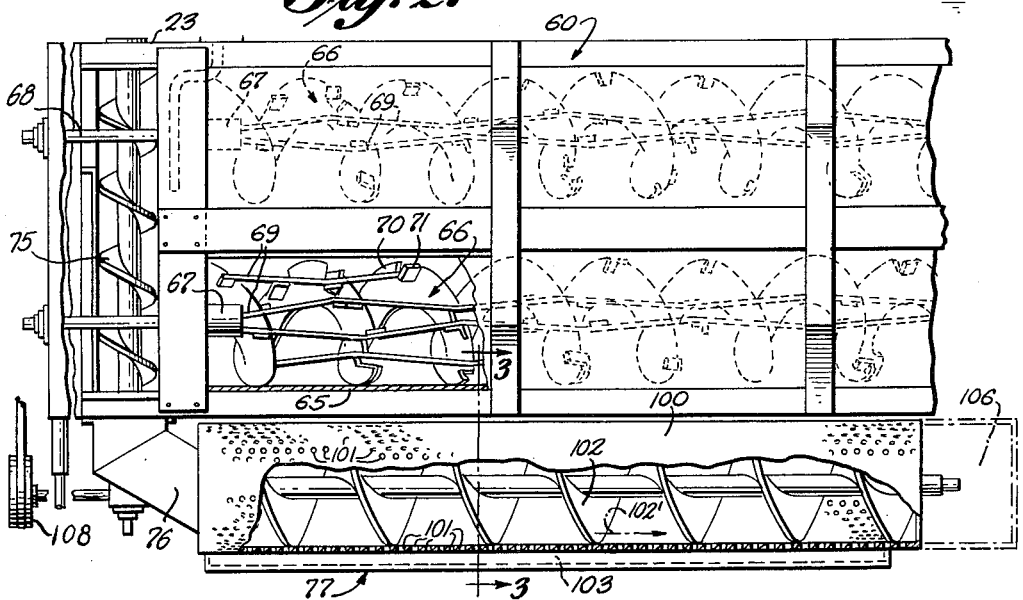
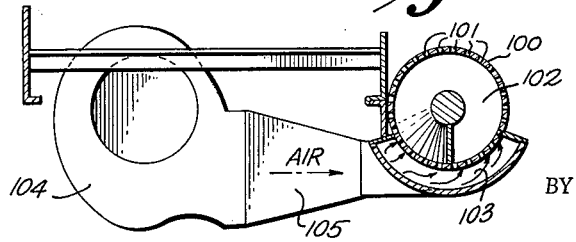
INVENTOR
John S. Wright
BY Andrew L. Bain
ATTORNEY United States Patent Office 3,217,427
Patented Nov. 16, 1965

3,217,427
GRAIN COOLING APPARATUS
John S. Wright, Carleton, Mich., assignor, by mesne assignments, to General Precision, Inc., Tarrytown, N.Y., a corporation of Delaware
Original application Apr. 15, 1960, Ser. No. 22,596, now Patent No. 3,152,873, dated Oct. 13, 1964. Divided and this application Dec. 27, 1963, Ser. No. 342,588
1 Claim. (Cl. 34—135)

This is a division of application Serial No. 22,596, now U.S. Patent No. 3,152,873.

This invention relates to the cooling of grain, and particularly to a method and apparatus for cooling grain quickly and in large quantities after it has been treated by a grain dryer.

Grain can be dried in various ways and by utilizing different sources of heat, such as heated air, for example. A major disadvantage of prior art grain dryers utilizing heated air has been that such grain dryers tend to scorch or adversely affect the composition of the grain such as the starch content, germination, protein and carbohydrate content. It is therefore imperative that the previously heated and dried grain be returned to equilibrium with the atmosphere as quickly as possible and in significantly continuous quantities, if the most efficient use of the drying apparatus is to be achieved.

It is therefore an object of the present invention to provide a novel method and apparatus for reducing the temperatures of freshly dried grain.

It is a further object of the invention to provide such a method and apparatus wherein the temperature is reduced quickly and in a single pass.

It is a further object of the invention to provide such a method and apparatus wherein the grain is handled continuously.

It is a further object of the invention to provide such a method and apparatus wherein novel conveyor means are provided.

In the drawings:

FIG. 1 is a perspective view of the apparatus embodying the invention showing the apparatus in operating position adjacent a truck.

FIG. 2 is a fragmentary horizontal sectional view of the cooling chamber of the invention taken along line 2—2 of FIG. 1 with parts being broken away; and FIG. 3 is a fragmentary vertical sectional view taken along the line 3—3 of FIG. 2.

Referring to FIG. 1, there is shown a grain dryer 20 comprising a housing 21 which defines a tunnel to one end 22 of which grain is continuously fed by hand or by a conveyor, not shown. The grain is carried through the tunnel beneath infrared generator assemblies or other heat source, not shown, to the other end 24 thereof and thereafter is carried through a cooler 25 where the temperature of the grain is reduced so that the grain can finally be removed by a portable screw conveyor 26 and loaded into a trailer or truck 27. As shown in FIG. 1, the grain dryer 20 is in the form of a trailer having wheels 28 and a yoke 29 whereby it can be attached to a motor vehicle for movement from one place to the other. A retractable support 30 on yoke 29 holds the end of the grain dryer 20 in spaced relation to the ground when the grain dryer is detached from the motor vehicle.

As the grain passes through the tunnel formed by the housing 21, it is subjected to infrared rays from the heat source which may include gas generators that discharge infrared rays.

As shown in FIG. 2, U-shaped troughs 65 extending horizontally in the dryer 20 provide supports for the grain and the grain is moved longitudinally and tumbled in troughs 65 by a screw conveyor 66. The screw conveyor 66 comprises hubs 67 rotatably mounted in each end of the frame 60 (one only being shown). Shaft 68 on hubs 67 at one end of the dryer extend into position where they can be driven. Wire rods 69 extend between pairs of hubs 67. A spiral 70 is formed by arcuate or annular pieces of metal joined successively and is welded to rods 69 to form the sprial which is open at its center. Tabs 71 are struck out from the periphery of spiral 70 and extend generally axially and the rods 69 are positioned in the struck out portions of the spiral and are welded thereto. In this fashion, the screw conveyor 66 is of such a construction that the grain is moved longitudinally and simultaneously tumbled. The use of the rods 69 eliminates the necessity for a solid shaft thereby preventing mashing or grinding of the grain as it is moved and tumbled.

As the grain leaves the end 23 of the conveyor, a transversely extending screw 75 moves the grain laterally to a conduit 76 that directs the grain to a cooling apparatus 77.

*Cooling apparatus*

Referring now to FIGS. 2 and 3, the cooling apparatus 77 comprises a perforated drum 100, the perforations 101 of which are smaller than the grain size. A screw 102 is fastened to the interior of the drum and the screw 102 is mounted for rotation through a drive mechanism 108 with the conveyor so that the screw 102 and drum 100 are rotated at a speed proportional to the speed of the conveyor 70 for conveying the grain through the tunnel housing 21.

An arcuate air chamber 103 is provided adjacent a portion of the periphery of the drum 100 and cooling air is supplied to the chamber 103 by a fan 104 connected to the chamber 103 by conduit 105. In this fashion, air is continuously supplied to the periphery of drum 100 passing through the grain to the opposite side of the drum thereby cooling the grain. The rotation of the screw 102 simultaneously with the drum 100 to which it is fixed moves the grain toward one end of the drum as indicated by arrow 102′ and discharges the grain into a hopper 106 from which it can be removed by a portable screw convyeor to a truck or other vehicle.

I claim:

Apparatus for cooling grain comprising an elongated perforated drum having an inlet at one end and an outlet at the other end, a screw conveyor fixed to the interior of said drum for rotation therewith for moving the grain from said inlet to said outlet as the drum rotates, means for rotating said drum, a fixed housing means extending along substantially the entire length of said drum and having an arcuate cross-section encircling part of said drum and defining an air chamber adjacent to the periphery of the drum, and means for delivering cooling air into said air chamber whereby the air passes into said drum through the perforations thereof as they move into alignment with said air chamber, through the grain in the drum and out of the drum through the remaining perforations which are not covered by the housing means.

References Cited by the Examiner

UNITED STATES PATENTS

| | | | |
|---|---|---|---|
| 1,173,188 | 2/1916 | Hetherington | 34—137 |
| 1,571,076 | 1/1926 | Warren | 34—135 |
| 1,651,390 | 12/1927 | Hersman | 34—127 |
| 1,697,268 | 1/1929 | Evesmith | 34—135 |
| 2,069,164 | 1/1937 | Vogel-Jorgensen | 34—135 |
| 2,561,442 | 7/1951 | Lyon et al. | 34—135 |
| 3,053,522 | 9/1962 | Applegate | 34—174 |

FOREIGN PATENTS 3,377    12/1866    Great Britain.

WILLIAM F. O'DEA, *Primary Examiner.*

NORMAN YUDKOFF, PERCY L. PATRICK,
*Examiners.*